July 15, 1947. J. MORKOSKI 2,424,185
AGRICULTURAL IMPLEMENT
Filed Nov. 22, 1943
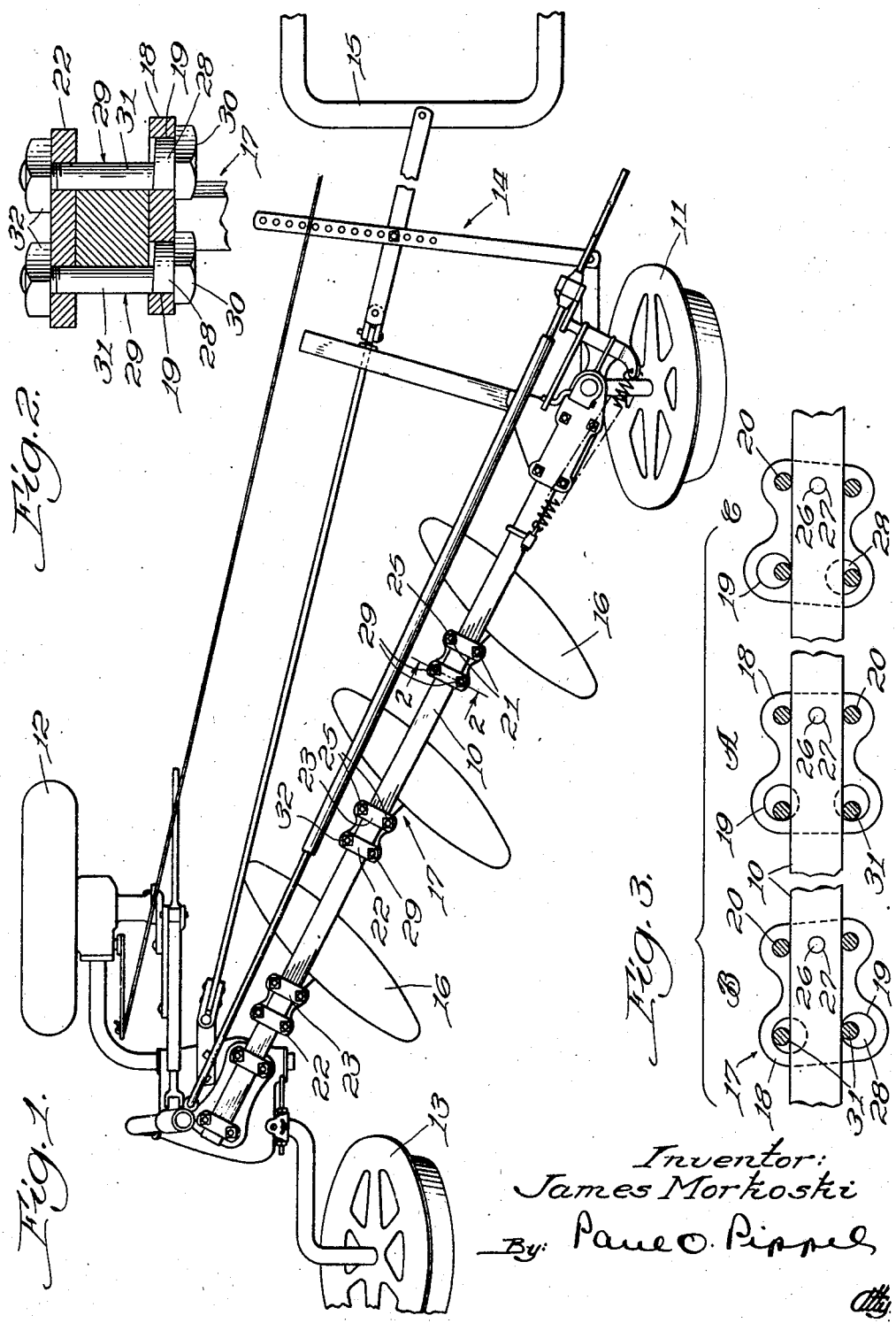
Inventor:
James Morkoski
By: Paul O. Pippel
Atty.

Patented July 15, 1947

2,424,185

UNITED STATES PATENT OFFICE 2,424,185

AGRICULTURAL IMPLEMENT

James Morkoski, Canton, Ill., assignor to International Harvester Company, a corporation of New Jersey Application November 22, 1943, Serial No. 511,257

6 Claims. (Cl. 97—198.1)

This invention relates to agricultural implements and particularly to means for connecting one member of an implement to another. More specifically, the invention relates to disk plows and to means for attaching the disks to the plow frame.

Disk plows generally comprise an elongated beam or frame structure, which is laterally inclined to the line of draft upon the plow, earth-working tools being mounted upon the frame at longitudinally spaced points. To meet varied soil conditions, etc., it is frequently desirable to change the angle of the disk with respect to the beam to adjust the width of cut thereof. Likewise, in order to change the width of cut of the entire plow, the angle of inclination of the beam with respect to the line of draft upon the plow is changed. When this is done, it is usually necessary to change the angle of the individual disks to compensate for this change in the angle of the beam. Many of the devices which have been previously proposed for permitting a change in the angle of the disks have been difficultly manipulatable, and have involved diminished resistance to strain upon the disks.

An object of the present invention is to provide means for connecting a plow disk standard to a frame.

Another object is to provide improved means for changing the angle of the plow disks.

A further object is to provide improved means for changing the angle of the disks without sacrificing resistance of the plow disk to strains encountered in plowing.

These and other objects will become clear from the following detailed description when read in conjunction with the accompanying drawings, wherein:

Figure 1 is a plan view of a plow embodying the features of the present invention;

Figure 2 is a sectional view taken along the line 2 of Figure 1 and looking in the direction of the arrow;

Figure 3 is a fragmentary plan view showing the manner in which the disk standard is connected to the plow beam for lateral adjustment in three different positions thereof.

Referring to the drawings, numeral 10 designates the longitudinally extending beam of a disk plow having a front furrow wheel 11, a land wheel 12, and a rear furrow wheel 13. It will be noted that the beam 10 is laterally inclined with respect to the line of draft upon the plow, and that the plow is connected by a hitch structure 14 to the draw bar 15 of a tractor, not shown. The details of construction of the plow shown, with the exception of the means by which the plow disks 16 are connected to the beam 10, form no part of the present invention, and for a full disclosure of the details of construction thereof, reference may be had to U. S. Patent Number 2,380,323, issued July 10, 1945, to James Morkoski.

It will be observed that the plow disks 16 are mounted upon the ends of standards 17, and that these standards are connected to the beam 10 and project vertically therebelow. With particular reference to Figures 2 and 3, it may be noted that the upper end of standard 17 is provided with a plate or flange portion 18. This flange portion 18 is provided with quadrilaterally arranged openings 19 and 20, openings 19 being in the forward portion of the flange and the openings 20 to the rear thereof. Openings 20 are adapted to receive bolts 21, which project upwardly and confine the side faces of the beam 10. Engaging the upper surface of the beam 10 are longitudinally spaced transverse straps 22 and 23. Straps 23 are provided with openings registering vertically with the openings 20 and adapted to receive the bolts 21, the upper ends of which are threaded to receive nuts 25. Projecting from the upper surface of the flange member 18 is a pin 26 adapted to be received in an opening 27 in the beam 10. The openings 19 in the forward portion of the flange 18 are enlarged to receive the shoulder portion 28 of a pair of bolts 29 having heads 30. These bolts are provided with eccentric shanks 31 engaging opposite faces of the beam 10, and passing through openings in the strap 22 on the upper face of the beam. These bolts are likewise threaded at their ends to receive nuts 32. Thus, the straps 22 and 23 constitute a clamping element coacting with the bolts 29 and nuts 32 to fasten standard 17 to the beam 10.

In Figure 3, the standard is shown at A in its normal average relation to the beam 10. When it is desired to change the angle of the disks 16 in relation to the beam, the nuts 25 and 32 are loosened, and the bolt heads 30 are rotated, causing the standard 17 to move laterally with respect to the beam about a center represented by the pivot of the beam upon the pin 26. For example, in the position marked B, the standard has been pivoted laterally to place the disk in position for a wide cut, while in the position marked C, the disk is in position for a narrow cut.

It should now be clear that a novel mechanism has been described for attaching a disk to a plow beam by which the disk may be angularly adjusted in order to change the width of cut thereof without sacrificing any of the strength of the attaching mechanism in any of its various positions.

Having now described the invention, it should be understood that modifications may be made therein without departing from the spirit of the invention or the scope of the appended claims.

What is claimed is:

1. Means for attaching a first member of an agricultural implement to a second member for relative angular adjustment comprising bolt-holes in the first member, means spaced from said bolt-holes serving as a pivot for angular movement of said first member with respect to said second member to prevent relative displacement of said members, bolts in said holes arranged to engage and confine opposite sides of said second member, each said bolt having a head portion adapted to be received in said opening and an eccentric shank portion, whereby rotation of said bolthead will cause pivotal movement of said first member with respect to said second member, a clamping element having openings for the reception of said shank portions, and means for clamping said element to the side of said second member opposite said first member.

2. Means for attaching a first member of an agricultural implement to a second member for relative angular adjustment comprising quadrilaterally arranged openings in the first member, bolts in certain of said openings adapted to engage and confine opposite sides of the second member, two of the openings in said first member being enlarged, two of the adjacent bolts on opposite sides of said second member having head portions adapted to be received in the enlarged openings in said first member, and eccentric shank portions, a clamping element engaging the face of said second member opposite said first member and having openings for the reception of the shank portions of said bolts, and nuts on the ends of said shank portions, said nuts when tightened cooperating with said clamping element to hold said first member against angular movement and when loosened permitting angular adjustment of said first member with respect to said second member by rotation of said bolts.

3. Means for attaching a first member of an agricultural implement to a second member for relative angular adjustment comprising quadrilaterally arranged openings in the first member, bolts in certain of said openings adapted to engage and confine opposite sides of the second member, two of the openings in said first member being enlarged, two of the adjacent bolts on opposite sides of said second member having head portions adapted to be received in the enlarged openings in said first member, and eccentric shank portions, a clamping element engaging the face of said second member opposite said first member and having openings for the reception of the shank portions of said bolts, nuts on the ends of said shank portions, said nuts when tightened cooperating with said clamping element to hold said first member against angular movement and when loosened permitting angular adjustment of said first member with respect to said second member by rotation of said bolts, and means serving as a pivot for angular movement of said first member with respect to said second member for preventing relative displacement of said members.

4. In an agricultural implement, a longitudinal generally rectangular frame member, a tool-carrying standard, means for adjustably attaching said standard to said frame including a clamp element engaging the face of the member opposite said standard, means pivoting said standard to said frame, means for effecting angular adjustment of said standard with respect to said frame including bolts engaging opposite sides of said member, said standard and said clamp element having registering openings spaced from the point of pivot of said standard to said frame and arranged to receive said bolts, each said bolt having a head portion and an eccentric shank portion adapted to be received in the openings in said standard and said element respectively, whereby angular movement of said standard about said pivot may be effected by rotating said bolts.

5. In an agricultural implement, a longitudinal generally rectangular frame member, a tool-carrying standard extending generally perpendicular to said frame member and adapted to be laterally adjusted to vary the width of cut of the tool, means for attaching the end of said standard to said member including a clamp element engaging the face of the member opposite said standard, means pivoting said standard to said frame comprising a projection on said standard and said member having an opening to receive said projection, means for effecting angular adjustment of said standard with respect to said frame including bolts engaging opposite sides of said member, said standard and said element having registering openings longitudinally spaced from the point of pivot of said standard to said frame and arranged to receive said bolts, the openings in said standard being larger than the openings in said element, each said bolt having a head portion adapted to fit the openings in said standard, and an eccentric shank portion adapted to be received in the openings in said element, whereby lateral adjustment of said standard may be effected by rotating said bolts.

6. In an agricultural implement, a longitudinal generally rectangular frame member, a tool-carrying standard, means for adjustably attaching said standard to said frame including longitudinally spaced transverse straps engaging the face of said member opposite said standard, bolts engaging opposite faces of said member and passing through registering openings in said straps and said standard, and means for angularly adjusting said standard with respect to said member about a center coincident with the connection of one of said straps to said standard, said last mentioned means including the provision of enlarged openings in said standard in registry with the openings in the other of said straps and bolts passing through said openings, each said bolt having a head fitted in said enlarged openings and an eccentric shank extending through the openings in said strap, whereby rotation of said eccentric bolts causes angular movement of said standard.

JAMES MORKOSKI.

REFERENCES CITED

The following references are of record in the file of this patent:

UNITED STATES PATENTS

| Number | Name | Date |
| --- | --- | --- |
| 751,202 | Porter | Feb. 2, 1904 |
| 199,398 | Babcock | Jan. 22, 1878 |
| 1,410,084 | Viar | Mar. 21, 1922 |
| 1,097,185 | Oehrle | May 19, 1914 |
| 1,926,326 | Boda | Sept. 12, 1933 |

FOREIGN PATENTS

| Number | Country | Date |
| --- | --- | --- |
| 345 | Great Britain | 1912 |